(12) United States Patent
Andersson et al.

(10) Patent No.: US 10,085,020 B2
(45) Date of Patent: Sep. 25, 2018

(54) SAMPLE ADAPTIVE FILTERING WITH OFFSETS

(71) Applicant: Telefonaktiebolaget L M Ericsson (publ), Stockholm (SE)

(72) Inventors: Kenneth Andersson, Gävle (SE); Rickard Sjöberg, Stockholm (SE); Per Wennersten, Årsta (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 291 days.

(21) Appl. No.: 14/389,671

(22) PCT Filed: Mar. 15, 2013

(86) PCT No.: PCT/SE2013/050270
§ 371 (c)(1),
(2) Date: Sep. 30, 2014

(87) PCT Pub. No.: WO2013/151481
PCT Pub. Date: Oct. 10, 2013

(65) Prior Publication Data
US 2015/0071340 A1 Mar. 12, 2015

Related U.S. Application Data

(60) Provisional application No. 61/624,726, filed on Apr. 16, 2012, provisional application No. 61/620,639, filed on Apr. 5, 2012.

(51) Int. Cl.
*H04N 19/117* (2014.01)
*H04N 19/13* (2014.01)
(Continued)

(52) U.S. Cl.
CPC ......... *H04N 19/117* (2014.11); *H04N 19/136* (2014.11); *H04N 19/146* (2014.11);
(Continued)

(58) Field of Classification Search
CPC .. H04N 19/117; H04N 19/136; H04N 19/146; H04N 19/172; H04N 19/176;
(Continued)

(56) References Cited

U.S. PATENT DOCUMENTS

2013/0114678 A1* 5/2013 Baylon ............... H04N 19/176
  375/240.02
2013/0177067 A1* 7/2013 Minoo ............ H04N 19/00006
  375/240.02
(Continued)

FOREIGN PATENT DOCUMENTS

WO    WO 2011/000947 A1    1/2011

OTHER PUBLICATIONS

Fu at el., "Sample Adaptive Offset for HEVC", Mediatek Inc., 2011.*
(Continued)

*Primary Examiner* — Mohammed Rahaman
*Assistant Examiner* — James Boylan
(74) *Attorney, Agent, or Firm* — Sage Patent Group

(57) ABSTRACT

A method, a filtering control device, a computer program and a computer program product for processing a first picture in a sample adaptive filtering procedure are disclosed. The first picture is reconstructed from video data. The filtering control device obtains an offset magnitude from the video data. The offset magnitude indicates a magnitude of a sample adaptive offset to be applied in the sample adaptive filtering procedure. The filtering control device obtains an offset sign from the video data. The offset sign indicates a sign of the sample adaptive offset. The filtering control device determines the sample adaptive offset based on the offset magnitude and the offset sign. Moreover, the filtering control device processes, in the sample adaptive
(Continued)

filtering procedure, at least a portion of the first picture while applying the sample adaptive offset.

20 Claims, 8 Drawing Sheets

(51) Int. Cl.

| | |
|---|---|
| *H04N 19/136* | (2014.01) |
| *H04N 19/146* | (2014.01) |
| *H04N 19/172* | (2014.01) |
| *H04N 19/176* | (2014.01) |
| *H04N 19/463* | (2014.01) |
| *H04N 19/70* | (2014.01) |
| *H04N 19/86* | (2014.01) |
| *H04N 19/91* | (2014.01) |
| *H04N 19/82* | (2014.01) |
| *H04N 19/42* | (2014.01) |

(52) U.S. Cl.
CPC ......... *H04N 19/172* (2014.11); *H04N 19/176* (2014.11); *H04N 19/42* (2014.11); *H04N 19/463* (2014.11); *H04N 19/70* (2014.11); *H04N 19/82* (2014.11)

(58) Field of Classification Search
CPC ...... H04N 19/42; H04N 19/463; H04N 19/70; H04N 19/82
USPC .................................................... 375/240.02
See application file for complete search history.

(56) References Cited

U.S. PATENT DOCUMENTS

| | | | | |
|---|---|---|---|---|
| 2013/0177068 A1* | 7/2013 | Minoo | ............ | H04N 19/00127 375/240.02 |
| 2013/0208788 A1* | 8/2013 | Chen | ..................... | H04N 19/82 375/240.02 |
| 2013/0308696 A1* | 11/2013 | Kim | ...................... | H04N 19/80 375/240.02 |

OTHER PUBLICATIONS

Yamazaki et al., Improvement of Sample Adaptive Offset with modified bit accuracy and restricted offsets, JCTVC-F396, Jul. 1, 2011.*

International Search Report, PCT Application No. PCT/SE2013/050270, Oct. 24, 2013.
Written Opinion of the International Searching Authority, PCT Application No. PCT/SE2013/050270, Oct. 24, 2013.
Andersson et al., "AHG 6: SAO simplification", Document: JCTVC-I0073 r1, *ISO/IEC Joint Collaborative Team on Video Coding (JCT-VC) of ITU-T SG 16 WP 3 and ISO/IEC JTC 1/SC 29/WG 11*, 9th Meeting: Geneva, CH, Apr. 27-May 7, 2012, 5 pp.
Fu et al., "Sample Adaptive Offset for HEVC", *IEEE 13th International Workshop on Multimedia Signal Processing*, Oct. 17, 2011, 5 pp.
Kim et al., "AhG5: Offset Scaling in SAO for High Bit-depth Video Coding", Document: JCTVC-M0335, *ISO/IEC Joint Collaborative Team on Video Coding (JCT-VC) of ITU-T SG 16 WP 3 and ISO/IEC JTC 1/SC 29/WG 11*, 13th Meeting: Incheon, KR, Apr. 18-26, 2013, 7 pp.
Yamakage et al., "Description of Core Experiment 8 (CE8): Non-deblocking loop filtering", Document: JCTVC-G1208, *ISO/IEC Joint Collaborative Team on Video Coding (JCT-VC) of ITU-T SG16 WP3 and ISO/IEC JTC1/SC29/WG11*, 6th Meeting: Torino, IT, Jul. 14-22, 2011, 12 pp.
Yamazaki et al., "Improvement of Sample Adaptive Offset with modified bit accuracy and restricted offsets", Document: JCTVC-F396, *ISO/IEC Joint Collaborative Team on Video Coding (JCT-VC) of ITU-T SG16 WP3 and ISO/IEC JTC1/SC29/WG11*, 6th Meeting: Torino, IT, Jul. 14-22, 2011, 4 pp.
Bross et al.: "High efficiency video coding (HEVC) text specification draft 6", Document: JCTVC-H1003, Joint Collaborative Team on Video Coding (JCT-VC) of ITU-T SG 16 WP 3 and ISO/IEC JTC1/SC29/WG11, 8th Meeting: San Jose, CA, Feb. 1-10, 2012, 259 pp.
Extended European Search Report corresponding to European Patent Application No. 15181811.9 (15 pages) (dated Mar. 31, 2016).
Ericsson et al. "On technical aspects on Heterogeneous Networks" Agenda Item: 8.2.3, Document for: Discussion and Decision, 3GPP TSG-RAN WG1 #59bis (4 pages) (Valencia, Spain, Jan. 18-22, 2010).
Ericsson et al. "Draft response to incoming RAN1 LS on Carrier Aggregation Types in R1-100828" Agenda Item: 8,10.1, Document for: Discussion, 3GPP TSG-RAN WG4 Meeting #54 (7 pages) (San Francisco, CA, US Feb. 22-26, 2010).
TSG RAN WG1 "LS on additional carrier types for LTE-A" Release-10, 3GPP TSG-RAN WG1 #59bis (2 pages) (Jan. 18-22, 2010).
Ericsson et al. "Acquiring synch in CA-based HetNet operations" Draft Change Request 3GPP TSG-RAN1 Meeting #65 (3 pages) (Barcelona, Spain, May 9-13, 2011).

* cited by examiner

Table II: Four edge types for edge offset

| | |
|---|---|
|  | edgeIdx = 0 |
|  | edgeIdx = 1 |
|  | edgeIdx = 3 |
|  | edgeIdx = 4 |

SAMPLE ADAPTIVE FILTERING WITH OFFSETS

TECHNICAL FIELD

Embodiments herein relate to processing of video data. In particular, a method, a filtering control device, a computer program and a computer program product for processing a first picture in a sample adaptive filtering procedure are disclosed.

BACKGROUND

Video data need to be processed in many different situations and applications. A very common kind of processing of video data is encoding and decoding of video data, typically for the purpose of compressing the video data at the source/encoder side by video encoding, and decompressing the encoded video data at the destination/decoder side by video decoding.

High Efficiency Video Coding (HEVC), also referred to as H.265, is a video compression standard. HEVC is developed jointly by the ISO/IEC Moving Picture Experts Group (MPEG) and Telecommunication Standardization Sector (ITU-T) Video Coding Experts Group (VCEG) as ISO/IEC 23008-2 MPEG-H Part 2 and ITU-T H.265. MPEG and VCEG have established a Joint Collaborative Team on Video Coding (JCT-VC) to develop the HEVC standard.

In a video coding or compression system compliant with, for instance, the HEVC standard, the video data is subjected to various processing steps, including for instance prediction, residual, transformation, quantization, deblocking and adaptive loop filtering. Along the processing path in the video coding or compression system, certain characteristics of the video data may be altered from the original video data due to the operations in the processing steps which the video data is subjected to. For example, artefacts in the form of shifts in image intensity (e.g. chrominance or luminance) may occur for pixels in a video frame, and/or between successive video frames. Such artefacts may be visually noticeable; therefore measures may be taken in order to compensate for the artefacts in an attempt to remove or at least alleviate them.

In HEVC, an intensity compensation scheme known as Sample Adaptive Offset (SAO) is used. The SAO scheme classifies each pixel in the video data into one of multiple SAO categories according to a given context. The context may for instance be the pixel intensity of the video data, which is often referred to as "SAO band offsets". Alternatively or additionally, the context may be a pixel value relation between the current pixel and its neighbouring pixels, which is often referred to as "SAO edge offsets". In the latter case, the SAO categories represent typical edge artefacts and are associated with respective corresponding offset values to be applied to pixels in the respective SAO category so as to compensate for the edge artefact in question. Depending on where the adaptive offset is applied, the video data may represent reconstructed video data, video data which has undergone deblocking, adaptive loop-filtered video data, or other video data in an intermediate stage during the encoding or decoding process. Hence, SAO may be used in HEVC after the deblocking filter process if a deblocking filter is used, otherwise directly after reconstruction of prediction and residual. SAO modifies the picture that is to be displayed or stored in a reference picture buffer. The reference picture buffer keeps pictures for later use for inter prediction of other pictures. If adaptive loop filtering is used it is normally performed after SAO.

More specifically, SAO compensation in HEVC involves four SAO edge offset categories. The first category represents a case where the current pixel (or more specifically its intensity value) is at a local minimum compared to its neighbouring two pixels in a selected direction—horizontal (0 degrees), vertical (90 degrees), or diagonal (135 or 45 degrees). The second category represents a case where the current pixel is equal to one of its neighbours but lower than the other neighbour in the selected direction. The third category represents a case where the current pixel is equal to one of its neighbours but higher than the other neighbour in the selected direction. The fourth category represents a case where the current pixel is at a local maximum compared to its neighbouring two pixels in the selected direction.

These four SAO categories are shown in FIG. 2a and will be explained in more detail later on in this document.

Deblocking filters are used in the video coding standards in order to combat blocking artefacts. The blocking artefacts arise because the original video frames are split into blocks which are processed relatively independently. The blocking artefacts can, for instance, arise due to different intra predictions of the blocks, quantization effects and motion compensation.

In HEVC there is a deblocking filter, also denoted loop filter, after prediction and residual reconstruction, but before storage of the reconstruction for later reference when encoding or decoding the subsequent frames. The deblocking filtering consists of several steps such as filter decisions, filtering operations, a clipping function and change of pixel values.

Currently SAO band and edge offset in HEVC have four offsets per Largest Coding Unit (LCU). Encoding these offsets is an overhead that makes many LCUs avoiding use of SAO edge or band offsets. Coding several offsets also consumes memory. A problem is hence that the several offsets consumes too much memory.

Another problem is that it costs many bits to use band or edge offset with large magnitudes for SAO in HEVC. For low bit rates where offset with large magnitudes are more probable it cause unnecessary overhead or less usage of offsets with large magnitudes A further problem with band offset is that it requires a pixel based table lookup to perform the band offset operation. The table has a size of 32 and need to be updated before processing each LCU.

Yet another problem with edge and band offset is that it requires clipping operations to allow a modification with band offset to stay within the bit depth of the video signal. For band offset in the HEVC reference software this is done by having a larger table 32+maxoffset/8−minoffset/8 where the ends of the table goes to minimum respectively maximum value according to the bitdepth. For edge offset this is done by having a table as large as the range of pixel values+maxoffset−minoffset. This is not mentioned in the HEVC working draft.

SUMMARY

An object is to improve a SAO procedure of the above mentioned kind in order to alleviate or at least reduce one or more of the aforementioned problems.

According to an aspect, the object is achieved by a method, performed by a filtering control device, for processing, in a sample adaptive filtering procedure, a first picture. The first picture is reconstructed from video data.

The filtering control device obtains an offset magnitude from the video data. The offset magnitude indicates a magnitude of a sample adaptive offset to be applied in the sample adaptive filtering procedure. The filtering control device obtains an offset sign from the video data. The offset sign indicates a sign of the sample adaptive offset. The filtering control device determines the sample adaptive offset based on the offset magnitude and the offset sign. Furthermore, the filtering control device processes, in the sample adaptive filtering procedure, at least a portion of the first picture while applying the sample adaptive offset.

According to another aspect, the object is achieved by a filtering control device configured to process a first picture in a sample adaptive filtering procedure. The first picture is reconstructed from video data. The filtering control device comprises a processing circuit configured to obtain an offset magnitude from the video data. The offset magnitude indicates a magnitude of a sample adaptive offset to be applied in the sample adaptive filtering procedure. The processing circuit is further configured to obtain an offset sign from the video data. The offset sign indicates a sign of the sample adaptive offset. Moreover, the processing circuit is configured to determine the sample adaptive offset based on the offset magnitude and the offset sign. Furthermore, the processing circuit is configured to process, in the sample adaptive filtering procedure, at least a portion of the first picture while applying the sample adaptive offset.

According to a further aspect, the object is achieved by a computer program (74) for processing, in a sample adaptive filtering procedure, a first picture, wherein the first picture is reconstructed from video data, wherein the computer program (74) comprises computer readable code units which when executed on a computer (70) causes the computer (70) to obtain an offset magnitude from the video data, wherein the offset magnitude indicates a magnitude of a sample adaptive offset to be applied in the sample adaptive filtering procedure and to obtain an offset sign from the video data, wherein the offset sign indicates a sign of the sample adaptive offset. Furthermore, the computer is caused to determine the sample adaptive offset based on the offset magnitude and the offset sign, and to process, in the sample adaptive filtering procedure, at least a portion of the first picture while applying the sample adaptive offset.

According to yet another aspect, the object is achieved by a computer program product, comprising computer readable medium and a computer program (74) according to the computer program above, being stored on the computer readable medium.

Thanks to that the offset sign and the offset magnitude are coded separately in the video data, the filtering control device is able to process at least a portion of the first picture in the sample adaptive filtering procedure while applying the sample adaptive offset, which has been determined based on the offset magnitude and the offset sign. The separate coding of offset magnitude and offset sign enables that the offset magnitude for both edge offset and band offset can be coded and/or decoded while using the same hardware/software capabilities of the filtering control device. Therefore, descriptions, in terms of standard specifications and hardware/software design elements of the offset magnitude and the offset sign may be less complex when considering both edge offset and band offset. Hence, a more efficient handling of the sample adaptive offset is achieved. As a consequence, an improvement of the sample adaptive filtering procedure in terms of coding efficiency of the sample adaptive offset is obtained.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
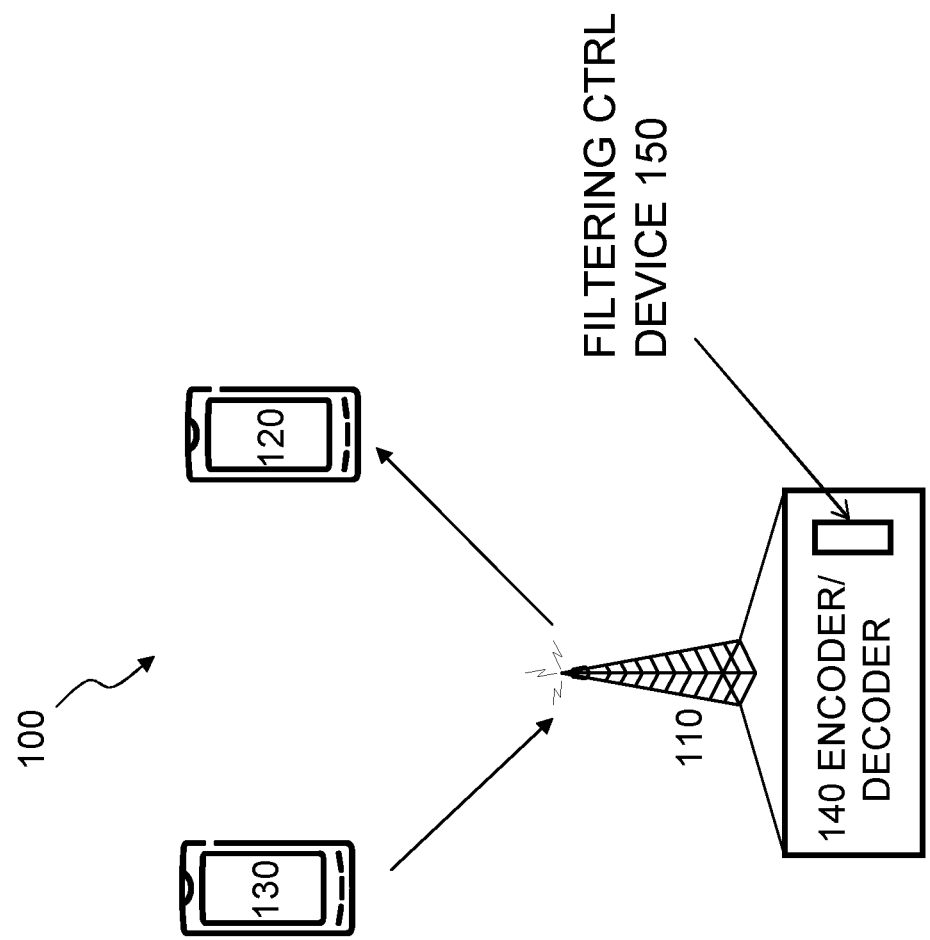
FIG. 1 is a schematic block diagram of an exemplifying radio communication system, in which exemplifying embodiments may be implemented.

Throughout the following description similar reference numerals have been used to denote similar elements, network nodes, devices, parts, items or features, when applicable. In the Figures, features that appear in some embodiments are indicated by dashed lines.

In order to facilitate understanding of HEVC a detail description of SAO in HVEC, according to "WD6: Working Draft 6 of High-Efficiency Video Coding", JCTVC-H1003_dk, pp 29-31, 34-35, 43-44, 70-72, 76, 83, 154-156, 170-171, 177, 186, USA, February 2012, is provided in the following.

Sample Adaptive Offsets in HEVC Draft

In HEVC SAO can be of two kinds, either edge offsets or band offsets. Edge offsets can be used in one of 4 directions, e.g. horizontal, vertical, diagonal from top left to bottom right, or diagonal from bottom left to top right. The four different types are shown in FIG. 1. The specific direction is determined by sao_type_idx=1 . . . 4. sao_type_idx=5 is used for band offsets.

When band offset is selected (e.g. sao_type_idx is 5) four offsets are used for four consecutive bands. The band position for the first band is indicated by sao_band_position. The following ordered steps apply:

If cldx is equal to 0, the variable bandShift is set equal to BitDepthY −5

Otherwise (cldx is not equal to 0), bandShift is set equal to BitDepthC −5. cldx corresponds to the color component (YUV), e.g. luma or one of the chroma components.

The variable saoLeftClass is set equal to sao_band_position[cldx][rx][ry]. rx and ry identifies the current coding tree block position.

The vector bandTable is defined with 32 elements and all elements are initially set to 0. Then, 4 of its elements (indicating the position of bands for which an offset is explicitly transmitted) are modified as follows:

```
for( i = 0; i < 4; i++ )
{
    bandTable[ (i + saoLeftClass) & 0x1F ] = i + 1
}
```

The reconstructed picture buffer recSaoPicture is modified as follows.

```
bandIdx = ( recPicture[ xC + i, yC + j ] >> bandShift )
recSaoPicture[ xC + i, yC + j ] = recPicture[ xC + i, yC + j ] +
saoValueArray[ bandTable[ bandIdx ] ]
    with i = 0..nS-1 and j = 0..nS-1
```

Note: To make the SAO band filtered value to stay within the allowed range according to the bit depth it is needed a clipping operation. This is not specified in the working draft HEVC but it exist table lookup based clipping in the HEVC reference software.

When edge offsets are selected (e.g. sao_type_idx is 1 or 2 or 3 or 4) four offsets are used for specific edge types. These four types are illustrated in Figure below. The edge types are derived for each pixel by:

$$\text{edgeIdx} = 2 + \Sigma_k \text{Sign}(\text{recPicture}[x,y] - \text{recPicture}[x + \text{hPos}[k], y + \text{vPos}[k]]) \text{ with } k=0\ldots 1$$

where recPicture is the picture after deblocking filter process, hPos and vPos are defined below:

TABLE I

Specification of hPos and vPos according to the type of sample adaptive offset process

| sao_type_idx[ cIdx ][ rx ][ ry ] | 1 | 2 | 3 | 4 |
|---|---|---|---|---|
| hPos[0] | -1 | 0 | -1 | 1 |
| hPos[1] | 1 | 0 | 1 | -1 |
| vPos[0] | 0 | -1 | -1 | -1 |
| vPos[1] | 0 | 1 | 1 | 1 |

The reconstructed picture buffer is modified as:

```
recSaoPicture[ xC + i, yC + j ] =
recPicture[ xC + i, yC + j ] + saoValueArray[ edgeTable[ edgeIdx ] ]
    with i = 0..nS-1 and j = 0..nS-1 where edgeTable[5] = { 1, 2, 0, 3, 4}.
```

Note: To make the SAO edge filtered value to stay within the allowed range according to the bit depth it is needed a clipping operation. This is not specified in the working draft HEVC but it exist clipping in software.

Figure 10:
FIG. 10 is a table illustrating edge types for edge offset.
Figure 10:
Figure 10:
Figure 10:
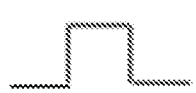

FIG. 10 illustrates Table II: Four edge types for edge offset.

saoValueArray is set equal to SaoOffsetVal[cIdx][rx][ry] which is defined below.

sao_type_idx[cIdx][rx][ry] indicates the offset type as specified in Table 7-6 of current coding treeblock at position rx and ry for the colour component cIdx.

When sao_type_idx[cIdx][rx][ry] is not present, it is inferred as follows.

If sao_merge_up_flag is equal to 1, sao_type_idx[cIdx][r][ry] is set equal to sao_type_idx[cIdx][rx][ry-1].

Otherwise, sao_type_idx[cIdx][rx][ry] is set equal to sao_type_idx[cIdx][rx-1][ry].

TABLE III

Specification of the edge type for SAO

| sao_type_idx[ cIdx ][ rx ][ ry ] | Edge type (informative) |
|---|---|
| 0 | Not applied |
| 1 | 1D 0-degree edge |
| 2 | 1D 90-degree edge |
| 3 | 1D 135-degree edge |
| 4 | 1D 45-degree edge |
| 5 | Band | sao_band_position[cIdx][rx][ry] indicates the displacement of the band offset of the pixel range when sao_type_idx[cIdx][rx][ry] is equal to 5.

When sao_band_position[cIdx][rx][ry] is not present it is inferred as follows.

If sao_merge_up_flag is equal to 1, sao_band_position[cIdx][rx][ry] is set equal to sao_band_position[cIdx][rx][ry-1].

Otherwise, sao_band_position[cIdx][rx][ry] is set equal to sao_band_position[cIdx][rx-1][ry].

sao_offset[cIdx][rx][ry][i] indicates the offset value of i-th category of current coding treeblock at position rx and ry for the colour component cIdx.

The variable bitDepth is derived as follows.

If cIdx is equal to 0, bitDepth is set equal to BitDepthY.

Otherwise (cIdx is equal to 1 or 2), bitDepth is set equal to BitDepthC.

It is a requirement of bitstream conformance that when sao_type_idx[cIdx][rx][ry] is not equal to 5, the values of sao_offset[cIdx][rx][ry][i] shall be in the range of 0 to (1<<(Min(bitDepth, 10)-5))-1, inclusive and otherwise, the values of sao_offset[cIdx][rx][ry][i] shall be in the range of -(1<<(Min(bitDepth, 10)-5)) to (1<<(Min(bitDepth, 10)-5))-1, inclusive.

When sao_offset[cIdx][rx][ry][i] is not present, it is inferred as follows.

If sao_merge_up_flag is equal to 1, sao_offset[cIdx][rx][ry][i] is set equal to sao_offset[cIdx][rx][ry-1][i].

Otherwise, sao_offset[cIdx][rx][ry][i] is set equal to sao_offset[cIdx][rx-1][ry][i].

The variable offsetSign is derived as follows.

If sao_type_idx[cIdx][rx][ry] is less than 5 and i is larger than 1, offsetSign is set to -1.

Otherwise (sao_type_idx[cIdx][rx][ry] is equal to 5 or i is less than 2), offsetSign is set to 1.

The array SaoOffsetVal is derived as follows.

```
SaoOffsetVal[ cIdx ][ rx ][ ry ][ 0 ] = 0
SaoOffsetVal[ cIdx ][ rx ][ ry ][ i + 1 ] =
    offsetSign*sao_offset[ cIdx ][ rx ][ ry ][ i ] << ( bitDepth - Min(bitDepth, 10 ) )
```

TABLE VI

| Syntax: | |
|---|---|
| | Descriptor |
| sao_offset_vlc( rx, ry, cIdx ) { | |
|   sao_type_idx[ cIdx ][ rx ][ ry ] | ue(v) |
|   if( sao_type_idx[ cIdx ][ rx ][ ry ] = =5 ) { | |
|     sao_band_position[ cIdx ][ rx ][ ry ] | u(5) |
|     for( i = 0; i < 4; i++ ) | |

TABLE VI-continued

| Syntax: | |
|---|---|
| | Descriptor |
| sao_offset[ cIdx ][ rx ][ ry ][ i ] | se(v) |
| } else if( sao_type_idx[ cIdx ][ rx ][ ry ] != 0 ) | |
| for( i = 0; i < 4; i++ ) | |
| sao_offset[ cIdx ][ rx ][ ry ][ i ] | ue(v) |
| } | |

Where rx and ry declare a position within the slice/picture and cIdx is the respective colour component.

FIG. 1 depicts an exemplifying radio communications system 100 in which embodiments herein may be implemented. In this example, the radio communications system 100 is a Long Term Evolution (LTE) system. In other examples, the radio communication system may be any radio-based network or any 3GPP cellular communication system, such as a Wideband Code Division Multiple Access (WCDMA) network, a Global System for Mobile communication (GSM network) or the like.

The radio communication system 100 comprises a network device 110. The network device 110 may be in the form of or comprised in a radio base station, a Node-B, a radio network node, a radio network controller, a base station controller or any other network node in the radio communication system 100.

The network device 110 may convert video according to one video coding standard to another video coding standard, for example, if it has been established that a receiving user equipment 120 is only capable of or prefers another video coding standard than the one sent from a sending unit 130. The receiving user equipment 120 and the sending unit 130 are comprised in the radio communication system 100. As used herein, the term "user equipment" and "sending unit" may refer to a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc.

Furthermore, the network device 110 may comprise an encoder and/or decoder 140. In more detail, the encoder and/or decoder 140 may comprise a filtering control device 150, in which may perform embodiments of the method illustrated in FIG. 2 as described in the following.

Figure 2:
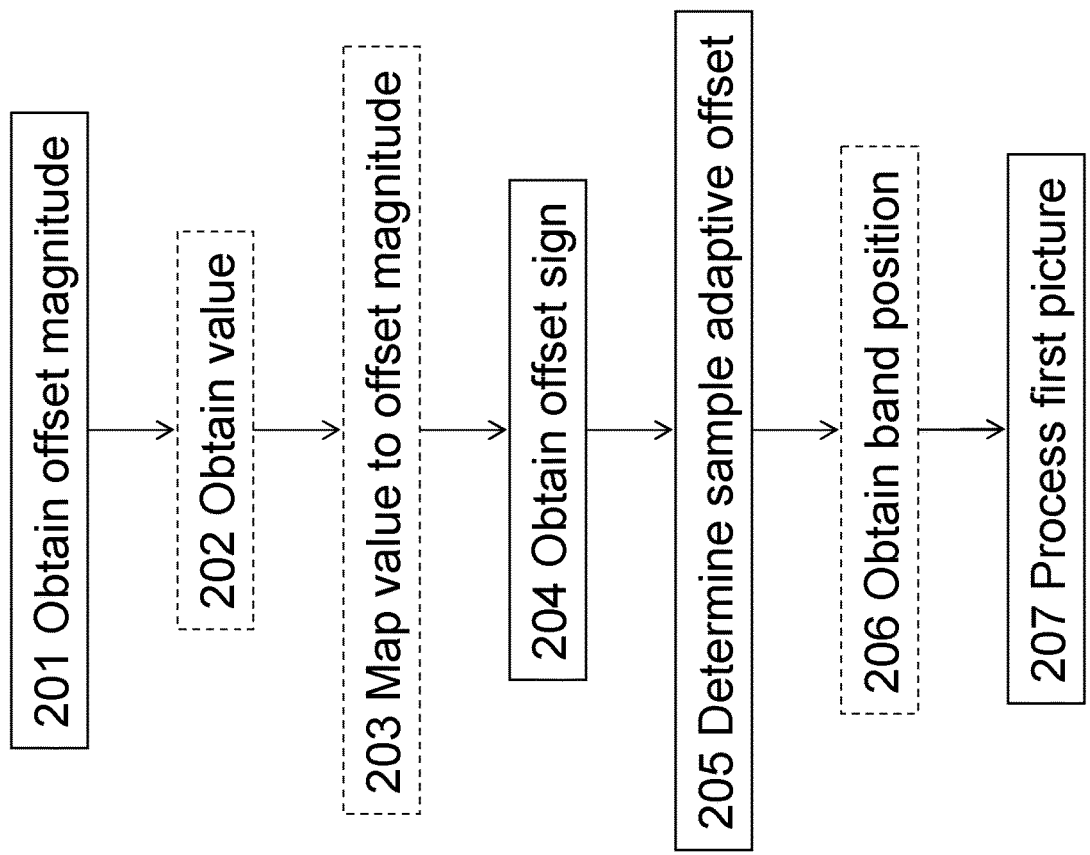
FIG. 2 is a schematic flowchart illustrating exemplifying methods according to embodiments herein.

FIG. 2 illustrates an exemplifying method, performed by the filtering control device 150, for processing a first picture in a sample adaptive filtering procedure. This means that the first picture is processed by the filtering control device 150 according to the sample adaptive filtering procedure. The first picture is reconstructed from video data, e.g. in a previous action according to known reconstruction methods.

As used herein, the term "a second picture" may be used to express that the first picture, or at least a portion thereof, has been processed in the sample adaptive filtering procedure. The second picture may be obtained as a full size picture being a modified version of the first picture. The second picture may be obtained as a modified version of the first picture by replacing picture values in the first picture directly if a copy of the portion of the first picture is kept. The copy of the portion of the un-modified first picture may be used to determine edge category in case of edge offsets. Alternatively or additionally, the second picture may be obtained by storing the modified pixel values in a further array and then when processing of the first picture is completed, the modified pixel values of the further array may be coped into a buffer of the first picture. Thereby, turning the first picture into the second picture.

The following actions may be performed in any suitable order.

Action 201

In order to be able to process the first picture in action 207 according to the sample adaptive filtering procedure while applying a sample adaptive offset, the filtering control device 150 obtains an offset magnitude from the video data. The offset magnitude indicates a magnitude of the sample adaptive offset to be applied in the sample adaptive filtering procedure, e.g. during processing of the first picture in action 207.

According to some first embodiments, the filtering control device 150 may obtain the offset magnitude by setting, e.g. by comprising the action of setting, the offset magnitude based on bit depth obtained from the video data. Further actions with reference to the first embodiments are described below.

According to some second embodiments, the filtering control device 150 may obtain the offset magnitude by obtaining, e.g. by comprising the action of obtaining, a boolean value from the video data. Then, the filtering control device 150 may derive the offset magnitude based on bit depth obtained from the video data when the boolean value is true.

Action 202

The filtering control device 150 may obtain a value from the video data. The value may be used in action 203 directly below.

Action 203

According to some third embodiments, the filtering control device 150 may map the value, obtained in action 202, to the offset magnitude in a non-linear manner. The mapping may be increasingly more sparse, in terms of resolution for the obtained offset magnitude, the greater the offset magnitude may be.

Action 204

The filtering control device 150 obtains an offset sign from the video data. The offset sign indicates a sign of the sample adaptive offset.

According to the first embodiments, the filtering control device 150 may obtain the offset sign by setting the offset sign based on the bit depth. In this manner, a pixel value of the second picture, e.g. after processing in the sample adaptive filtering procedure, is between 0 and a maximum value according to the bit depth as obtained after the processing 207 of the at least a portion of the first picture.

Action 205

The filtering control device 150 determines the sample adaptive offset based on the offset magnitude and the offset sign;

According to some fourth embodiments, the filtering control device 150 determines the sample adaptive offset by directly computing, e.g. by comprising the action of directly computing, the sample adaptive offset by means of sign operations and shift operations onto the offset magnitude and the offset sign.

A shift magnitude of the shift operation may be obtained from the video data. Alternatively or additionally, the shift magnitude of the shift operation may be pre-defined. For example, a pre-defined shift magnitude may be overridden by a shift magnitude obtained from the video data. The shift magnitude indicates a number of bits to be shifted in the shift operation. As an example, 1<<x, where x is the shift magnitude, means that bits are shifted x steps to the left. This corresponds to a multiplication by $2^x$. Therefore, if the shift magnitude is 1 the shift operation corresponds to a multiplication by 2. Similarly, if the shift magnitude is 2, the shift operation corresponds to a multination by 4 and so on.

Action 206

The filtering control device 150 may obtain, from the video data, a band position indicating a first band of a set of consecutive bands. The offset magnitude and the offset sign may be applied to one or more of the set of consecutive bands.

Action 207

The filtering control device 150 processes, in the sample adaptive filtering procedure, at least a portion of the first picture while applying the sample adaptive offset. In this manner, as explained above, the second picture may be obtained. The second picture may be improved thanks to the processing according to the sample adaptive filtering procedure.

According to the first embodiments, the filtering control device 150 processes the at least a portion of the first picture by applying, e.g. by comprising the action of applying, the sample adaptive offset to one of the consecutive bands. The offset sign may be positive, e.g. restricted to be positive: when the band position indicates an initial band among bands covering possible pixel values according to bit depth obtained from the video data for the second picture. Furthermore, the offset sign may be negative, e.g. restricted to be negative: when the band position indicates a band for which the sample adaptive offset covers a last band among bands covering possible pixel values according to bit depth obtained from the video data for the second picture.

According to some embodiments, the number of band offsets for SAO, when applied in image or video coding, is reduced. Thus, memory consumed for storing band offset may be reduced as well and also improve coding efficiency.

Thanks to the use of a different width of the band, the offset may be applied to more than the accuracy of the band position. In other words, when a width of the band is different, i.e. wider, than the resolution, or accuracy, of the band position, the sample adaptive offset may be applied to many pixel values while still having a high accuracy with respect to a starting position, e.g. the band position, where the sample adaptive offset may be applied.

Figure 4:
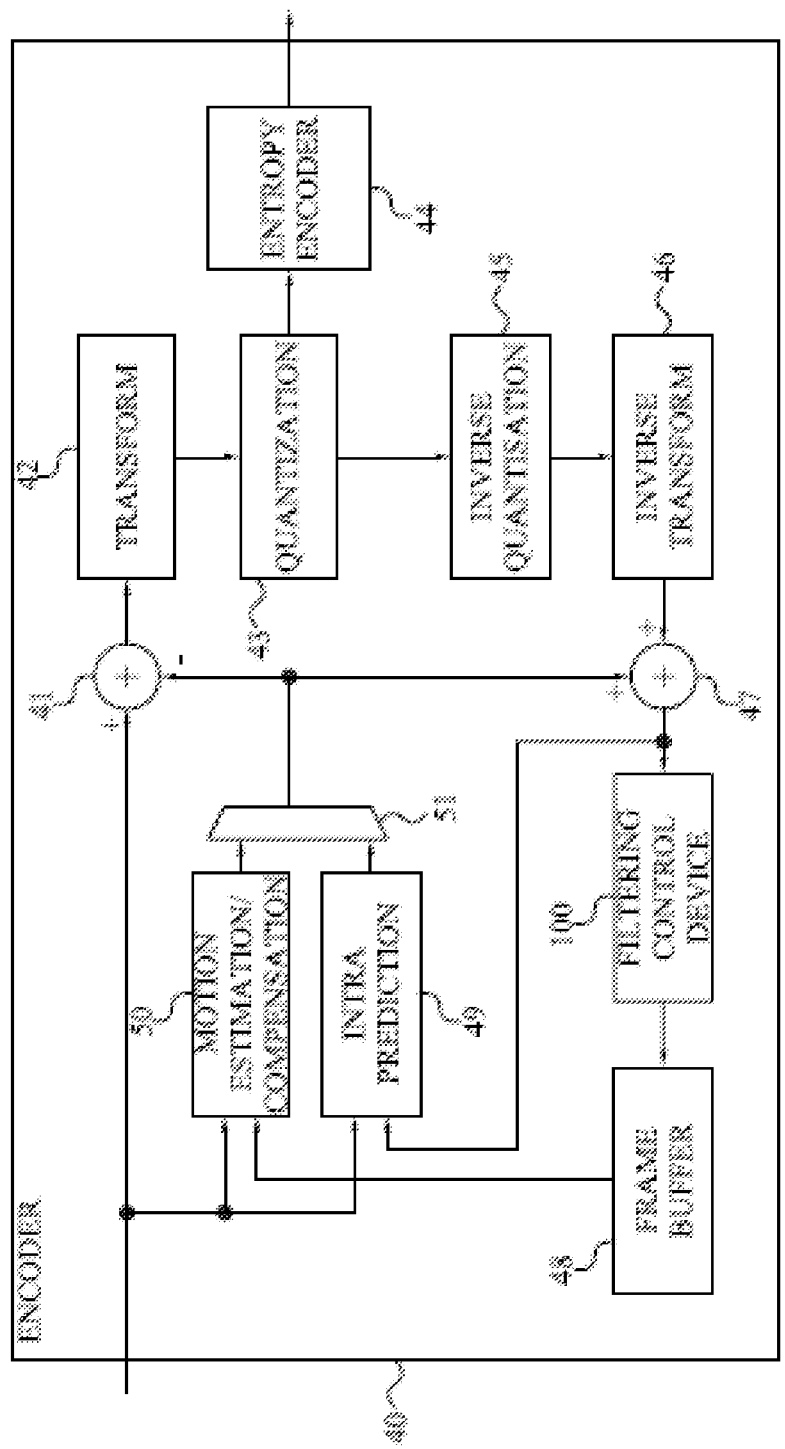
FIG. 4 is a schematic block diagram illustrating an exemplifying encoder comprising a filtering control device according to embodiments herein.
Figure 5:
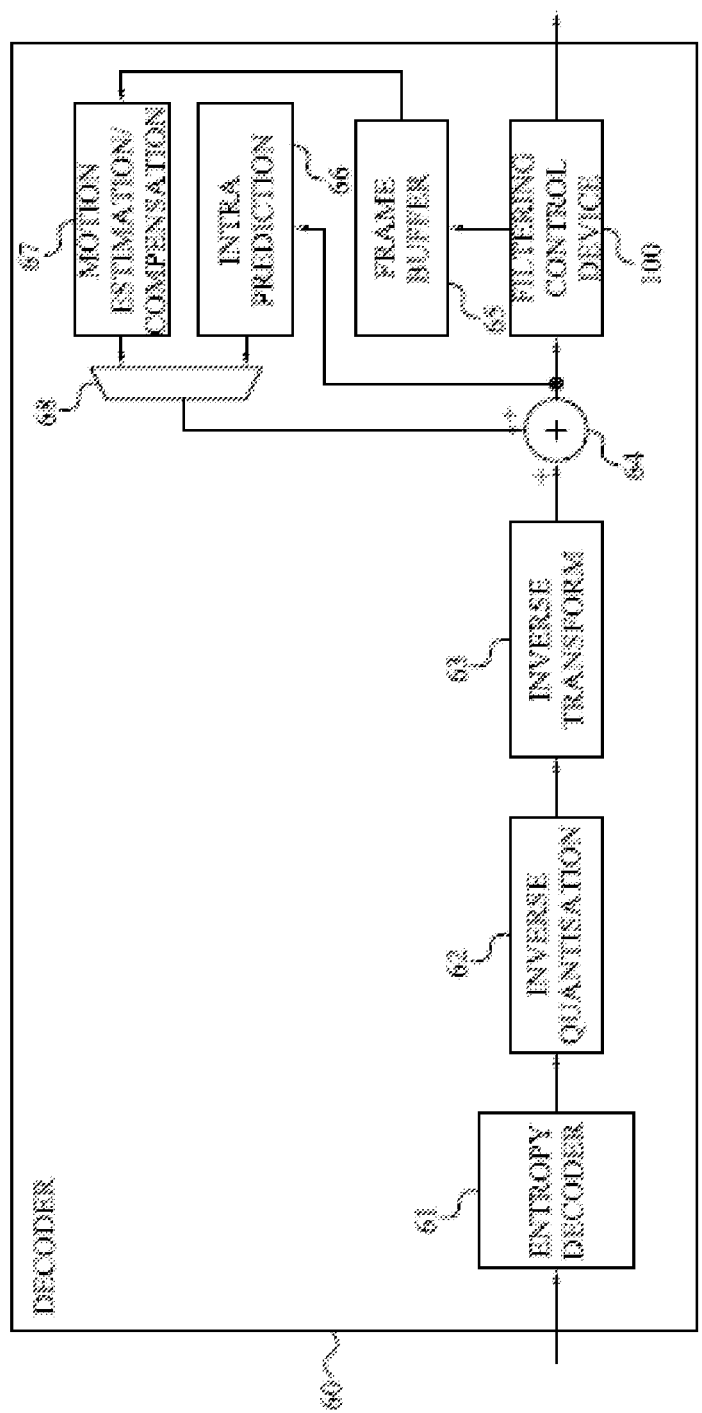
FIG. 5 is a schematic block diagram illustrating an exemplifying decoder comprising a filtering control device according to embodiments herein.

The method may be performed in the filtering device 150 which may be located in an encoder or a decoder as schematically illustrated in FIGS. 4 and 5. FIGS. 4 and 5 illustrate the example when the method is performed inside the coding loop.

An advantage with some embodiments is that one band offset may be used while obtaining similar coding efficiency as using 4 band offsets.

In this embodiment it is assumed that each band is 8 pixel values wide (0 . . . 7, 8 . . . 15, . . . ) same as HEVC and for 8-bit depth this corresponds to 32 bands. Other widths of bands are possible, for example for 10-bit depth each band is typically 32 pixel values wide.

The band position sao_band_position determine the position of the first band that an offset should be applied to.

Same offset is applied for both the band pointed by the band position but also one or more neighbouring band(s).

A band position sao_band_position is decoded, saoLeftClass. At least one offset is decoded. The offset is set for the corresponding index of a table, e.g. bandTable below, including all bands. Other index of the table have a zero offset.

In the example below only one offset (n=1) is used and two bands are given the same offset, the band pointed out by the band position (saoLeftClass) and the band pointed out by saoLeftClass-1. However it could instead be specified as the band pointed out by band position saoLeftClass and the band pointed out by saoLeftClass+1.

```
for( i = 0; i < n; i++ )
{
    bandTable[ (i + saoLeftClass) & 0x1F ] = i + 1
    if(saoLeftClass >0)
    {
        bandTable[ (i + saoLeftClass - 1) & 0x1F ] = i + 1
    }
}
```

The reconstructed picture buffer recSaoPicture is modified as follows.

```
bandIdx = ( recPicture[ xC + i, yC + j ] >> bandShift )
recSaoPicture[ xC + i, yC + j ] = recPicture[ xC + i, yC + j ] +
saoValueArray[ bandTable[ bandIdx ] ]
    with i = 0..nS-1 and j = 0..nS-1
```

The variable offsetSign is derived as follows.

If sao_type_idx[cIdx][rx][ry] is less than 5 and i is larger than 1, offsetSign is set to -1.

Otherwise (sao_type_idx[cIdx][rx][ry] is equal to 5 or i is less than 2), offsetSign is set to 1.

The array SaoOffsetVal is derived as follows when sao_type_idx[ cIdx ][ rx ][ ry ] is equal to 5.
SaoOffsetVal[ cIdx ][ rx ][ ry ][ 0 ] = 0
SaoOffsetVal[ cIdx ][rx ][ ry ][ 1 ] = sao offset
 sign[ cIdx ][ rx ][ ry ]*(1 << sao offset[ cIdx ][ rx ][ ry ])

TABLE V

Sample adaptive offset VLC syntax

| | Descriptor |
|---|---|
| sao_offset_vlc( rx, ry, cIdx ) { | |
|   sao_type_idx[ cIdx ][ rx ][ ry ] | ue(v) |
|   if( sao_type_idx[ cIdx ][ rx ][ ry ] = =5 ) { | |
|     sao_band_position[ cIdx ][ rx ][ ry ] | u(5) |
|    ~~for( i = 0; i < 4; i++ )~~ | |
|     sao offset sign[cIdx ][rx][ry] | u(1) |
|     sao_offset[ cIdx ] [ rx] [ ry ]~~[ i ]~~ | ue(v) |
|   } else if( sao_type_idx[ cIdx ][ rx ][ ry ] != 0 ) | |
|     for( i = 0; i < 4; i++ ) | |
|       sao_offset[ cIdx ][ rx][ ry ][ i ] | ue(v) |
| } | |

TABLE VI

Sample adaptive offset CABAC syntax

| | Descriptor |
|---|---|
| sao_offset_cabac( rx, ry, cIdx ) { | |
|     sao_type_idx[ cIdx ][ rx ][ ry ] | ae(v) |
|     if( sao_type_idx[ cIdx ][ rx ][ ry ] = =5 ){ | |
|         sao_band_position[ cIdx ][ rx ][ ry ] | ae(v) |
|         <u>sao_offset_sign[cIdx ][rx][ry]</u> | <u>ae(v)</u> |
|         <u>sao_offset[cIdx ][rx][ry ]</u> | <u>ae(v)</u> |
|     } else if( sao_type_idx[ cIdx ][ rx ][ ry ] != 0 ) | |
|         for( i = 0; i < 4; i++ ) | |
|             sao_offset[ cIdx ][ rx][ ry ][ i ] | ae(v) |
| } | |

Underlining indicates changes as compared to previous drafts of the present standard specification.

sao_offset_sign[cldx][rx][r] indicates the sign of the band offset value of i-th category of current coding treeblock at position rx and ry for the colour component cldx An extension of this algorithm is to vary the number of bands an offset is applied to. The number of bands can be 1, 2, 3 or 4. The number of bands can either be signaled with variable length code or fixed length code or coded by CABAC.

With reference to FIG. 2, a set of embodiments have been described. The set of embodiments include the first embodiments, the second embodiments, the third embodiments and the fourth embodiments. The first to fourth embodiments may be used separately or may be combined. It shall as a matter of fact be noted that these embodiments may also be performed without the actions 201, 204 and 205 in which separated offset sign and offset magnitude for the determination of the sample adaptive offset is used.

The embodiments can be used in an encoder and/or a decoder or completely outside the coding loop as a post filter. In typical applications the embodiments are applied after deblocking filtering if such filtering is used. However in some application it may be of interest to apply it before deblocking.

Figure 3:
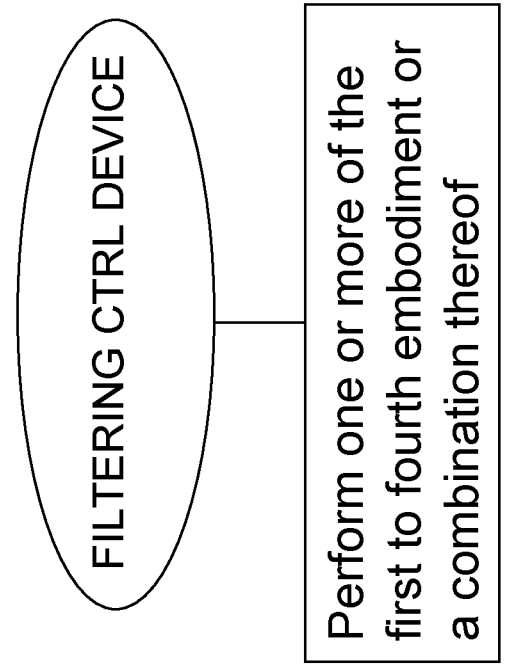
FIG. 3 is another schematic flowchart illustrating exemplifying methods according to embodiments herein.

With reference to FIG. 3, the first through fourth embodiments are described.

Beginning with the first embodiments, clipping operations in edge or band offsets are avoided thanks to a limitation of the sample adaptive offset so that clipping not is needed. Advantageously, encoder and decoder complexity may be reduced.

The band offsets, e.g. a sample adaptive offset for a particular band, may be restricted by only allowing positive offsets for the first band and avoiding having larger negative offsets for other bands that can cause the need of clipping operation. Similarly for the highest band only allow negative offsets and for the other bands require that positive offsets not cause that SAO filtered pixel value exceeds the maximum value according to the bit depth.

Both band and edge offsets may be restricted for the current LCU so that a selected offset not can cause that the SAO filtered pixel value goes below 0 or exceeds the maximum value according to the bit depth.

The method is performed in a filtering control device which can be located in an encoder or a decoder as schematically illustrated in FIGS. 4 and 5. FIGS. 4 and 5 illustrate the example when the method is performed inside the coding loop.

A further advantage with the first embodiments is that a decoder does not need to do a pixel based clipping operation. As a result, as mentioned above, complexity of the decoder is reduced.

Now, some further details regarding the first embodiments are presented. The first embodiments achieve a limitation of edge or band offsets in order to avoid clipping operations.

One restriction that may be applied to both edge offset and band offset is to specify for a bitstream to be conformant to the standard that no transmitted offset can cause that the SAO filtered pixel to exceed the maximum value or the minimum value according to the bit depth. Thus no clipping operation for SAO filtered pixels need to be specified in the standard and the decoder will be saved from such operations for SAO filtering.

Example: Assume that 8-bit video is used. In that case the minimum value is 0 and the maximum value is 255. Following this restriction the SAO filtered pixel value will be in the range of 0 to 255.

One restriction for band offset is to only allow positive offset for the first band and negative offset for the last band. Other bands can be restricted to have a maximum and minimum offset so that SAO filtering with band offset stay within the bit depth range.

Example: Assume that the bandldx is 0 for the current pixel to be filtered by band offset. In that case the offset will always be positive so that the SAO filtered pixel value is within the range of 0 to maximum value according to the bit depth.

A further extension of this band offset only restriction is to omit signalling any sign for the first and last band and thus remove some overhead at the same time as avoiding clipping operation after SAO filtering to ensure to be within the bit depth range.

TABLE VII

Example:

| | Descriptor |
|---|---|
| sao_offset_vlc( rx, ry, cIdx ) { | |
|     sao_type_idx[ cIdx ][ rx ][ ry ] | ue(v) |
|     if( sao_type_idx[ cIdx ][ rx ][ ry ] = =5 ) { | |
|         sao_band_position[ cIdx ][ rx ][ ry ] | u(5) |
|         for( i = 0; i < 4; i++ ){ | |
|             If((sao_band_position==0 && i==0) \|\| Sao_band_position+i==31)) | |
|                 sao_offset[ cIdx ][ rx][ ry ][ i ] | ue(v) |
|            Else | |
|                 sao_offset[ cIdx ][ rx][ ry ][ i ] | se(v) |
|         } | |
|     } else if( sao_type_idx[ cIdx ][ rx ][ ry ] != 0 ) | |
|         for( i = 0; i < 4; i++ ) | |
|             sao_offset[ cIdx ][ rx][ ry ][ i ] | ue(v) |
| } | |

An array SaoOffsetVal is specified as

```
SaoOffsetVal[ cIdx ][ rx ][ ry ][ 0 ] = 0
if((sao_type_idx[ cIdx ][ rx ][ ry ] = =5)&&(i==3)&&(
sao_band_position[ cIdx ][ rx ][ ry ]+i==31)
    SaoOffsetVal[ cIdx ][ rx ][ ry ][ i + 1 ] =
        −(sao_offset[ cIdx ][ rx ][ ry ][ i ] << ( bitDepth
    − Min( bitDepth, 10 ) ))
    else
        SaoOffsetVal[ cIdx ][ rx ][ ry ][ i + 1 ] =
            sao_offset[ cIdx ][ rx ][ ry ][ i ] << ( bitDepth −
    Min( bitDepth, 10 ) )
        with i = 0..3
```

Again referring to the second embodiments, according to which a fixed offset is turned on/off for a respective edge offset. The fixed offset is adjusted according to bit depth.

Hence, this embodiment relates to restricting edge offset to either be 0 or to have a predefined value according to bit depth. Advantageously, an overhead for coding edge offsets and memory consumption for storing them are reduced. A further advantage is that the decoder not needs to perform any pixel based clipping operation after filtering with edge offsets.

These embodiments relate to restricting edge offset to either be 0 or to have a predefined value according to bit depth.

In this case it is only signalled if an edge offset is used or not used as indicated by a flag sao_offset[cIdx][rx][ry][i] for respective edge offset. The flag is 1 or 0.

```
        edgeIdx equal to 0 have SaoOffsetVal equal to
sao_offset[ cIdx ][ rx ][ ry ][ i ] <<(bitDepth-8)
        edgeIdx equal to 1 have SaoOffsetVal equal to
sao_offset[ cIdx ][ rx ][ ry ][ i ] <<(bitDepth-8)
        edgeIdx equal to 2 have SaoOffsetVal equal to 0
        edgeIdx equal to 3 have SaoOffsetVal equal
to −(sao_offset[ cIdx ][ rx ][ ry ][ i ] <<(bitDepth-8))
        edgeIdx equal to 4 have SaoOffsetVal equal
to −(sao_offset[ cIdx ][ rx ][ ry ][ i ] <<(bitDepth-8))
```

A further benefit of these embodiments is that no clipping will be required in the SAO filtering process for 8 bit video (bitDepth equal to 8) since the SAO filtered pixel value will not exceed the neighbouring pixel value.

The array SaoOffsetVal is derived as follows when sao_type_idx[cIdx][rx][ry] is in the range of 1 to 4:

```
SaoOffsetVal[ cIdx ][ rx ][ ry ][ 0 ] = 0
SaoOffsetVal[ cIdx ][ rx ][ ry ][ i + 1 ] =
    offsetSign*(sao_offset[ cIdx ][ rx ][ ry ][ i ] << (bitDepth-8))
    (7-37)
Where offsetSign is defined above.
```

To enable SAO filtering with edge offsets for higher bit depth than 8 without clipping the edge type classification can be modified as follows:

The edge types are derived for each pixel by:

edgeIdx=2+$\Sigma_k$ Sign((recPicture[x,y]>>bitDepthIncr−recPicture[x+hPos[k],y+vPos[k]]>>bitDepthIncr)) with $k$=0 . . . 1 where recPicture is the picture after deblocking filter process, hPos and vPos are defined above. bitDepthIncr is equal to bitDepth-8.

To enable SAO filtering with edge offsets with larger edge offsets and still work without clipping a shift (rightShift) that is determined by the edge offset can be used as follows:

The edge types are derived for each pixel by:

edgeIdx=2+$\Sigma_k$ Sign((recPicture[x,y]>>rightShift−recPicture[x+hPos[k],y+vPos[k]]>>rightShift)) with $k$=0 . . . 1

If edge offset is 3 rightShift is equal to 2. Typically rightShift can be set to the power of 2 that is closest to the maximum offset magnitude.

Again referring to the third embodiments, according to which an overhead for coding offsets with large magnitudes for SAO, when applied in image or video coding, may be reduced. Hence, improvements with regard to coding efficiency may be achieved.

These embodiments may be applied to both edge offsets and band offsets after the reconstructed pixel values have been filtered by deblocking. This is done on both encoder and decoder side. It is also possible to only apply it for either band offset or edge offset.

According to the third embodiments decoded offsets, which typically are distributed linearly with respect to offset magnitude, are mapped to a non-linear order of offset magnitudes. Thereby, offsets with large magnitude are more sparsely represented than offsets with smaller magnitudes, for example with base 2, e.g. . . . , −8, −4, −2, −1, 0, 1, 2, 4, 8, . . . , etc. after the mapping. Similarly in the encoder, the offsets are restricted to non-uniformly distributed offset magnitudes and is mapped to a linear distribution of offset magnitudes e.g . . . , −3, −2, −1, 0, 1, 2, 3, . . . , etc, before coding. The offset coding/decoding can by variable length coding VLC, fixed length coding FLC or CABAC. The method is performed in a filtering control device which can be located in an encoder or a decoder as schematically illustrated in FIGS. 4 and 5. FIGS. 4 and 5 illustrate the example when the method is performed inside the coding loop.

An advantage with the third embodiments is that large offsets may be used using fewer bits. Hence, coding efficiency is improved.

Now, some further details regarding the third embodiments are presented. The third embodiments achieve a more efficient coding and/or decoding of band offsets and/or edge offsets.

These embodiments may be applied for coding/decoding of band and/or edge offsets. The offsets are mapped between linear and non-linear magnitudes.

In this description it is assumed that offsets are encoded with a base two but other bases or table lookup can be used to find the correspondence between coded/decoded offset and the actual offset to be used in the SAO filtering process.

In the encoder an offset SaoOffsetVal is restricted to . . . −8, −4, −2, −1, 0, 1, 2, 4, 8 . . . .

The offset to be encoded is determined as:

sao_offset=table(abs(SaoOffsetVal))*sign(SaoOffsetVal)

where the table corresponds to log 2(abs(SaoOffsetVal)) or the actual arithmetic function log 2 in this example, and where Sign($x$)—when $x$>0 it is equal to 1, when $x$=0 it is equal to 0, otherwise −1

One example of fast sign computation is from HEVC where Sign(x)=((x>>31)|((int)((((unsigned int)−x))>>31)))

$x$>>$n$—corresponds to $x/2^n$ e.g. if $n$=1 it is equal to $x/2$ $x$<<$n$—corresponds to $x*2^n$ e.g. if $n$=1 it is equal to $x*2$ $x|y$—logical OR, when at least one of $x$ or $y$ is 1 it is equal to 1 log 2($x$)—is the logarithm with base 2 of $x$ bit depth—bit depth defines the range of allowed pixel values. 8-bit content only have values between 0 and 255 ($2^8$−1).

The offset is then coded by variable length code or fixed length code or CABAC. The magnitude and the sign may be coded separately or together.

The decoder decode the codeword to obtain offset and then determine SaoOffsetVal:

SaoOffsetVal=(1<<abs(sao_offset))*sign(sao_offset)

In the case only one offset is coded/decoded the SaoOffsetVal can be forbidden to be equal to 0 and thus reduce the number of bits for coding non-zero offsets.

The SaoOffsetVal is then used to update the current pixel value when SAO have been selected to be used for that pixel:

recSaoPicture[*xC+i,yC+j*]=recPicture[*xC+i,yC+j*]+
SaoOffsetVal

Again referring to the fourth embodiments, in which the band offset is derived by direct computation using sign operations. In this manner, a need for pixel based table lookup, when band offsets are applied, is omitted. Hence, these embodiments may advantageously reduce memory consumed for storing band offsets.

The method is performed in a filtering control device which can be located in an encoder or a decoder as schematically illustrated in FIGS. 4 and 5. FIGS. 4 and 5 illustrate the example when the method is performed inside the coding loop.

An advantage with the fourth embodiments is that band offsets may be implemented without table look up.

Now, some further details regarding the fourth embodiments are presented.

In this example, it is assumed that only one band offset is transmitted.

Determine bandIdx for respective pixel as:

bandIdx=(recPicture[*xC+i,yC+j*]>>bandShift)−
saoLeftClass

Modify the pixel as:

recSaoPicture[ xC + i, yC + j ] = recPicture[ xC + i, yC + j ] +
(sign(bandIdx +R1)+sign(−bandIdx+R2)) << C where C either can have a fixed value determined by the standard or be variable length or fixed length coded and provided in the bitstream (correspond to 0, 1, 2, 3 . . . ). When higher bit-depth than 8 is used C can be increased with log 2(bit depth −8).

R1=1 and R2=0 when the offset is positive, an R1=0 and R2=−1 when the offset is negative.

The indication whether an offset is positive or negative can be provided in the bitstream or be fixed.

As mentioned above, yet further embodiments may be obtained by combining one or more of the embodiments described above. Advantageously, an overhead for coding edge and band offsets may be reduced. Moreover, memory for storing edge and band offsets may be reduced by using fewer offsets and with restriction on the offset values. Advantages with these embodiments are reduced memory consumption for storing edge and band offsets. Additionally, the decoder needs not to perform any pixel based clipping operation after filtering with edge or band offsets.

The methods of the embodiments are performed in a filtering device which can be located in an encoder or a decoder as schematically illustrated in FIGS. 4 and 5. FIGS. 4 and 5 illustrate the example when the method is performed inside the coding loop. That is to say, all of the embodiments herein may be implemented in the filtering control device 150, denoted 100 in FIGS. 4 and 5.

FIG. 4 is a schematic block diagram of an encoder 40 for encoding a block of pixels in a video frame of a video sequence according to an embodiment.

A current block of pixels is predicted by performing a motion estimation by a motion estimator 50 from an already provided block of pixels in the same frame or in a previous frame. The result of the motion estimation is a motion or displacement vector associated with the reference block, in the case of inter prediction. The motion vector is utilized by a motion compensator 50, which is co-located with the motion estimator 50, for outputting an inter prediction of the block of pixels. In other examples, the motion compensator and the motion estimator may be separate entities.

An intra predictor 49 computes an intra prediction of the current block of pixels. The outputs from the motion estimator/compensator 50 and the intra predictor 49 are input in a selector 51 that either selects intra prediction or inter prediction for the current block of pixels. The output from the selector 51 is input to an error calculator in the form of an adder 41 that also receives the pixel values of the current block of pixels. The adder 41 calculates and outputs a residual error as the difference in pixel values between the block of pixels and its prediction.

The error is transformed in a transformer 42, such as by a discrete cosine transform, and quantized by a quantizer 43 followed by coding in an encoder 44, such as by entropy encoder. In inter coding, also the estimated motion vector is brought to the encoder 44 for generating the coded representation of the current block of pixels.

The transformed and quantized residual error for the current block of pixels is also provided to an inverse quantizer 45 and inverse transformer 46 to retrieve the original residual error. This error is added by an adder 47 to the block prediction output from the motion compensator 50 or the intra predictor 49 to create a reference block of pixels that can be used in the prediction and coding of a next block of pixels. This new reference block is first processed by a filtering control device 100, as an example of the afore mentioned filtering control device 150, in order to control any filtering that is applied to the reference block to combat any artifact. The processed new reference block is then temporarily stored in a frame buffer 48, where it is available to the intra predictor 49 and the motion estimator/compensator 50.

FIG. 5 is a corresponding schematic block diagram of a decoder 60 comprising a filtering control device 100 according to embodiments herein. The decoder 60 comprises a decoder unit 61, such as entropy decoder, for decoding an encoded representation of a block of pixels to get a set of quantized and transformed residual errors. These residual errors are de-quantized in an inverse quantizer 62 and inverse transformed by an inverse transformer 63 to get a set of residual errors.

These residual errors are added in an adder 64 to the pixel values of a reference block of pixels. The reference block is determined by a motion estimator/compensator 67 or an intra predictor 66, depending on whether inter or intra prediction is performed. In most examples, the motion estimator/compensator 67 only performs motion compensation. A selector 68 is thereby interconnected to the adder 64 and the motion estimator/compensator 67 and the intra predictor 66. The resulting decoded block of pixels output from the adder 64 is input to a filtering control device 100 in order to control any filter that is applied to combat any artifacts. The filtered block of pixels is output form the decoder 60 and is furthermore preferably temporarily provided to a frame buffer 65 and can be used as a reference block of pixels for a subsequent block of pixels to be decoded. The frame buffer 65 is thereby connected to the motion estimator/compensator 67 to make the stored blocks of pixels available to the motion estimator/compensator 67.

The output from the adder 64 is preferably also input to the intra predictor 66 to be used as an unfiltered reference block of pixels.

In the embodiments disclosed in FIGS. 4 and 5 the filtering control device 100 controls filtering in the form of so called in-loop filtering. In an alternative implementation at the decoder 60, the filtering control device 100 is arranged to perform so called post-processing filtering. In such a case, the filtering control device 100 operates on the output frames outside of the loop formed by the adder 64, the frame buffer 65, the intra predictor 66, the motion estimator/compensator 67 and the selector 68. No filtering and filter control is then typically done at the encoder.

Figure 6:
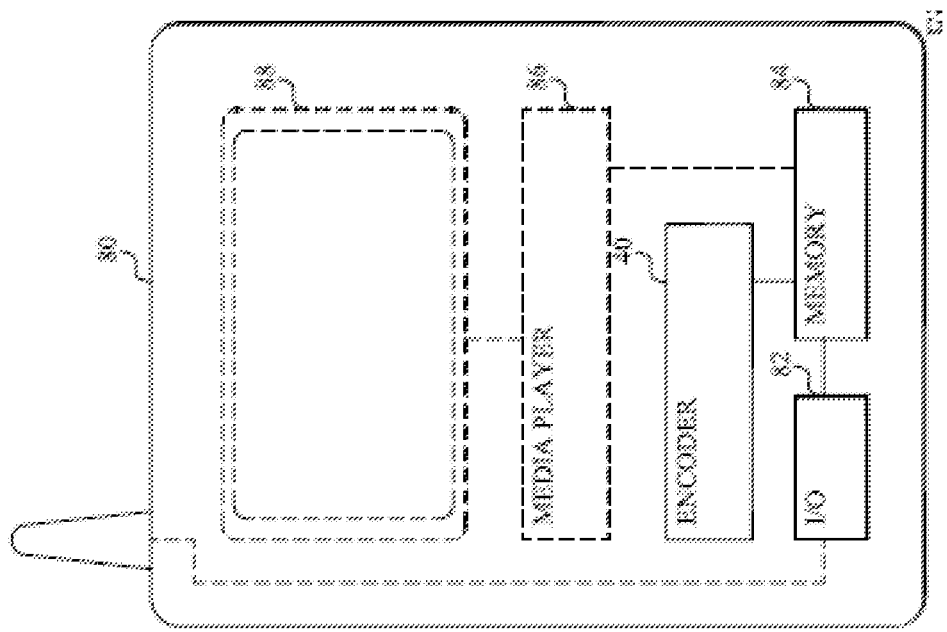
FIG. 6 is a schematic block diagram illustrating an exemplifying user equipment.

FIG. 6 is a schematic block diagram of a user equipment or media terminal 80 housing a decoder 60 with a filtering control device. The user equipment 80, as an example of the receiving user equipment 120, can be any device having media decoding functions that operates on an encoded video stream of encoded video frames to thereby decode the video frames and make the video data available. Non-limiting examples of such devices include mobile telephones and other portable media players, tablets, desktops, notebooks, personal video recorders, multimedia players, video streaming servers, set-top boxes, TVs, computers, decoders, game consoles, etc. The user equipment 80 comprises a memory 84 configured to store encoded video frames. These encoded video frames can have been generated by the user equipment 80 itself. Alternatively, the encoded video frames are generated by some other device and wirelessly transmitted or transmitted by wire to the user equipment 80. The user equipment 80 then comprises a transceiver (transmitter and receiver) or input and output port 82 to achieve the data transfer.

The encoded video frames are brought from the memory 84 to a decoder 60, such as the decoder illustrated in FIG. 5. The decoder 60 comprises a filtering control device 100 according to embodiments. The decoder 60 then decodes the encoded video frames into decoded video frames. The decoded video frames are provided to a media player 86 that is configured to render the decoded video frames into video data that is displayable on a display or screen 88 of or connected to the user equipment 80.

FIG. 6 illustrates another embodiment of a user equipment 80, as an example of the sending unit 130, that comprises en encoder, such as the encoder of FIG. 4, comprising a filtering control device according to the embodiments. The encoder 40 is then configured to encode video frames received by the I/O unit 82 and/or generated by the user equipment 80 itself. In the latter case, the user equipment 80 preferably comprises a media engine or recorder, such as in the form of or connected to a (video) camera. The user equipment 80 may optionally also comprise a media player 86, such as a media player 86 with a decoder and filtering control device according to the embodiments, and a display 88.

Figure 7:
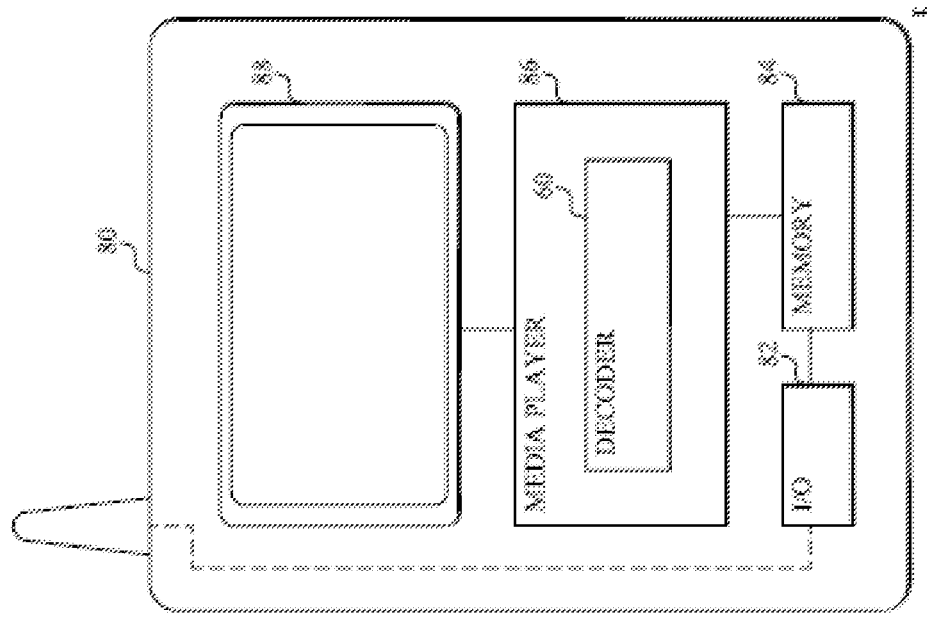
FIG. 7 is another schematic block diagram illustrating another exemplifying user equipment.

FIG. 7 is a schematic block diagram of a user equipment or media terminal 80 housing a decoder 60 with a filtering control device. The user equipment 80 can be any device having media decoding functions that operates on an encoded video stream of encoded video frames to thereby decode the video frames and make the video data available. Non-limiting examples of such devices include mobile telephones and other portable media players, tablets, desktops, notebooks, personal video recorders, multimedia players, video streaming servers, set-top boxes, TVs, computers, decoders, game consoles, etc. The user equipment 80 comprises a memory 84 configured to store encoded video frames. These encoded video frames can have been generated by the user equipment 80 itself. Alternatively, the encoded video frames are generated by some other device and wirelessly transmitted or transmitted by wire to the user equipment 80. The user equipment 80 then comprises a transceiver (transmitter and receiver) or input and output port 82 to achieve the data transfer.

The encoded video frames are brought from the memory 84 to a decoder 60, such as the decoder illustrated in FIG. 5. The decoder 60 comprises a filtering control device 100 according embodiments herein. The decoder 60 then decodes the encoded video frames into decoded video frames. The decoded video frames are provided to a media player 86 that is configured to render the decoded video frames into video data that is displayable on a display or screen 88 of or connected to the user equipment 80.

In FIG. 7, the user equipment 80 has been illustrated as comprising both the decoder 60 and the media player 86, with the decoder 60 implemented as a part of the media player 86. This should, however, merely be seen as an illustrative but non-limiting example of an implementation embodiment for the user equipment 80. Also distributed implementations are possible where the decoder 60 and the media player 86 are provided in two physically separated devices are possible and within the scope of user equipment 80 as used herein. The display 88 could also be provided as a separate device connected to the user equipment 80, where the actual data processing is taking place.

Figure 8:
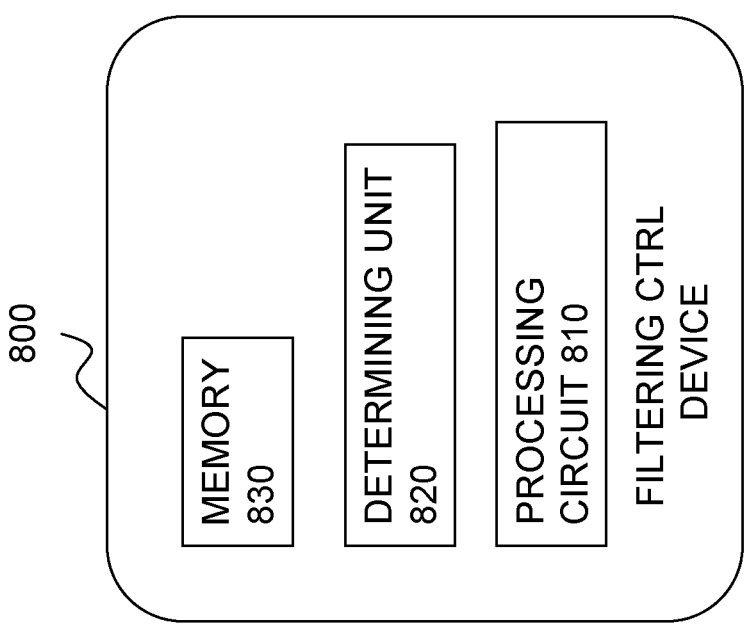
FIG. 8 is a further schematic block diagram illustrating an exemplifying filtering control device according to embodiments herein.

Accordingly as illustrated in FIG. 8, the filtering control device implements the functions of embodiments herein.

With reference to FIG. 8, a schematic block diagram of an exemplifying filtering control device 800 configured to process a first picture in a sample adaptive filtering procedure is shown. The filtering control device may be the filtering control device 150 of FIG. 1. As mentioned, the first picture is reconstructed from video data.

The filtering control device 800 may be comprised in a network device 110, a decoder 140 or an encoder 140.

The filtering control device 800 comprises a processing circuit 810 configured to obtain an offset magnitude from the video data. The offset magnitude indicates a magnitude of a sample adaptive offset to be applied in the sample adaptive filtering procedure.

The processing circuit 810 is further configured to obtain an offset sign from the video data. The offset sign indicates a sign of the sample adaptive offset.

Moreover, the processing circuit 810 is configured to determine the sample adaptive offset based on the offset magnitude and the offset sign.

Furthermore, the processing circuit 810 is configured to process, in the sample adaptive filtering procedure, at least a portion of the first picture while applying the sample adaptive offset. In this manner, a second picture may be obtained.

The processing circuit 810 may further be configured to obtain, from the video data, a band position indicating a first band of a set of consecutive bands.

The processing circuit 810 may further be configured to apply the offset magnitude and the offset sign to one or more of the consecutive bands.

The processing circuit 810 may further be configured to obtain a value from the video data, to map the value to the offset magnitude in a non-linear manner. The mapping may be increasingly more sparse, in terms of resolution for the obtained offset magnitude, the greater the offset magnitude may be.

The processing circuit 810 may further be configured to set the offset magnitude based on bit depth obtained from the video data for the second picture, and to set the offset sign based on the bit depth, whereby a pixel value of the second picture is between 0 and a maximum value according to the bit depth.

The processing circuit 810 may further be configured to apply the sample adaptive offset to one of the consecutive bands, wherein the offset sign is positive when the band position indicates an initial band among bands covering possible pixel values according to bit depth obtained from the video data, and the offset sign is negative when the band position indicates a band for which the sample adaptive offset covers a last band among bands covering possible pixel values according to bit depth obtained from the video data for the second picture.

The processing circuit 810 may further be configured to directly computing the sample adaptive offset by means of sign operations and shift operations onto the offset magnitude and the offset sign.

A shift magnitude of the shift operation is obtained from the video data. Additionally or alternatively, the shift magnitude of the shift operation is pre-defined.

The processing circuit 810 may further be configured to obtain a boolean value from the video data; and derive the offset magnitude based on bit depth obtained from the video data when the boolean value is true.

The processing circuit 810 may be a processing unit, a processor, an application specific integrated circuit (ASIC), a field-programmable gate array (FPGA) or the like. As an example, a processor, an ASIC, an FPGA or the like may comprise one or more processor kernels.

The filtering control device 800 may further comprise a determining unit 820 configured to determine the sample adaptive offset. Therefore, in some examples, the processing circuit 810 may comprise the determining unit 820. In other examples, as illustrated in FIG. 8, the determining unit 820 is separated from the processing circuit 810.

Additionally, the filtering control device 800 may comprise an obtaining unit configured to obtain the offset magnitude, the offset sign, the value, the band position and/or other values, parameters or the like disclosed herein.

Furthermore, the filtering control device 800 may comprise a mapping unit configured to map the value to the offset magnitude.

The filtering control device 800 further comprises a memory 830 for storing software to be executed by, for example, the processing circuit. The software may comprise instructions to enable the processing circuit to perform the method in the filtering control device 150 as described above in conjunction with FIG. 2. The memory may be a hard disk, a magnetic storage medium, a portable computer diskette or disc, flash memory, random access memory (RAM) or the like. Furthermore, the memory may be an internal register memory of a processor.

Figure 9:
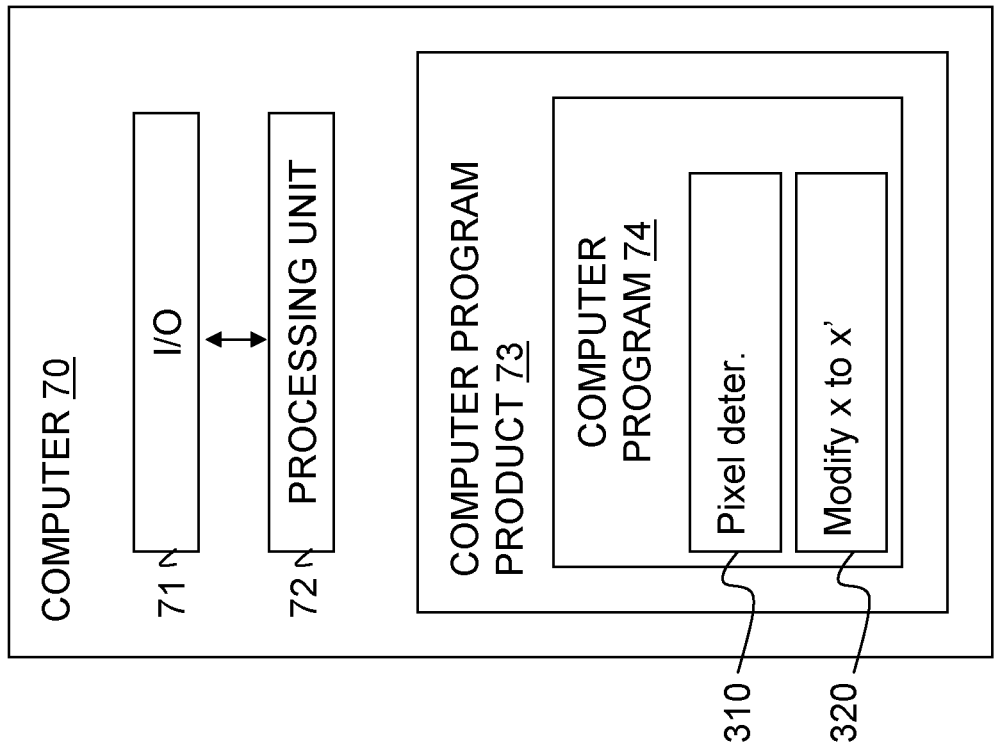
FIG. 9 is a still further schematic block diagram illustrating an exemplifying computer configured according to embodiments herein.

FIG. 9 schematically illustrates an embodiment of a computer 70 having a processing unit 72, such as a DSP (Digital Signal Processor) or CPU (Central Processing Unit). The processing unit 72, as an example of the processing circuit 810 above, may be a single unit or a plurality of units for performing different steps of the method described herein. The computer 70 also comprises an input/output (I/O) unit 71 for receiving recorded or generated video frames or encoded video frames and outputting encoded video frame or decoded video data. The I/O unit 71 has been illustrated as a single unit in FIG. 9, but may likewise be in the form of a separate input unit and a separate output unit.

Furthermore, the computer 70 comprises at least one computer program product 73 in the form of a non-volatile memory, for instance an EEPROM (Electrically Erasable Programmable Read-Only Memory), a flash memory or a disk drive. The computer program product may comprise computer readable medium and a computer program 74 as explained below. The computer program is stored on the computer readable medium.

As mentioned, the computer program product 73 comprises the computer program 74, which comprises code means which when run on or executed by the computer 70, such as by the processing unit 72, causes the computer 70 to perform the steps of the method described in the foregoing in connection with FIG. 1. In more detail, the computer program 74 is capable of processing, in a sample adaptive filtering procedure, a first picture. As mentioned, the first picture is reconstructed from video data. The computer program 74 comprises computer readable code units which when executed on the computer 70 causes the computer 70 to obtain an offset magnitude from the video data. The offset magnitude indicates a magnitude of a sample adaptive offset to be applied in the sample adaptive filtering procedure and to obtain an offset sign from the video data. The offset sign indicates a sign of the sample adaptive offset. Furthermore, the computer is caused to determine the sample adaptive offset based on the offset magnitude and the offset sign, and to process, in the sample adaptive filtering procedure, at least a portion of the first picture while applying the sample adaptive offset. Hence, in an embodiment the code means, or the code units, in the computer program 74 comprises a module 310 corresponding to any embodiment disclosed herein. The module 310 essentially performs the steps of the flow diagrams in FIGS. 2 and 3 when run on the processing unit 72. Thus, when the module 310 is run on the processing unit 72 they correspond to the corresponding units 810-820 of FIG. 8. In such a case, the user equipment 80 may additionally comprise or be connected to a display to display video data.

In the foregoing description in conjunction with FIGS. 8 and 9, the memory 830, the computer program product 74 and the computer readable medium have the same or similar function. In some examples, one or more of these entities may be combined into one entity. The embodiments of the solution relates to image and video processing and coding. The embodiments can be used in broadcast TV, internet TV, video conferencing, storage of video/image content, etc. The embodiments can be part of encoder and/or decoder in mobile devices as well as stationary devices, etc.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a decoder comprising a filtering control device, for decoding, in a sample adaptive filtering procedure, a first picture, wherein the first picture is reconstructed from video data comprising a coded bitstream, the method comprising:
    decoding an offset magnitude from the video data comprising the coded bitstream, wherein the offset magnitude indicates a magnitude of a sample adaptive offset, saoOffset, to be applied in the sample adaptive filtering procedure;

decoding an offset sign from the video data comprising the coded bitstream, wherein the offset sign indicates a sign of the sample adaptive offset saoOffset;

wherein the sample adaptive offset saoOffset is a band offset and/or an edge offset, wherein the sample adaptive offset saoOffset is coded by variable length code or fixed length code or Context-Adaptive Binary Arithmetic Coding, CABAC, and the offset sign and the offset magnitude are coded separately in the video data;

wherein a mapping exists between the sample adaptive offset saoOffset and a further sample adaptive offset value SaoOffsetVal, the mapping being:

saoOffset=log2(abs(SaoOffsetVal))*sign(SaoOffsetVal);

determining the further sample adaptive offset value SaoOffsetVal based on the offset magnitude and the offset sign; and processing, in the sample adaptive filtering procedure, at least a portion of the first picture by applying the further sample adaptive offset value SaoOffsetVal.

2. The method according to claim 1, further comprising:
decoding, from the video data comprising the coded bitstream, a band position indicating a first band of a set of consecutive bands.

3. The method according to claim 2, wherein the offset magnitude and the offset sign are applied to one or more of the set of consecutive bands.

4. The method according to claim 1, wherein obtaining of the offset magnitude comprises:
obtaining a value from the video data; and
mapping the value to the offset magnitude in a non-linear manner, wherein the mapping decreases in terms of accuracy for the obtained offset magnitude as the offset magnitude increases.

5. The method according to claim 1,
wherein an output of the sample adaptive filtering procedure is stored in a second picture, and
wherein the obtaining of the offset magnitude comprises setting the offset magnitude based on bit depth obtained from the video data, and wherein the obtaining of the offset sign comprises setting the offset sign based on the bit depth, whereby a pixel value of the second picture is between 0 and a maximum value according to the bit depth as obtained after the processing of the at least a portion of the first picture.

6. The method according to claim 5, wherein the processing further comprises applying the further sample adaptive offset value SaoOffsetVal to one of the consecutive bands, wherein:
the offset sign is positive when the band position indicates an initial band among bands covering possible pixel values according to bit depth obtained from the video data for the second picture, and
the offset sign is negative when the band position indicates a band for which the further sample adaptive offset value SaoOffsetVal covers a last band among bands covering possible pixel values according to bit depth obtained from the video data for the second picture.

7. The method according to claim 1, wherein the determining of the further sample adaptive offset value SaoOffsetVal comprises directly computing the sample adaptive offset by applying sign operations and shift operations onto the offset magnitude and the offset sign.

8. The method according to claim 7, wherein a shift magnitude of the shift operation is obtained from the video data.

9. The method according to claim 1, wherein the obtaining of the offset magnitude comprises obtaining a boolean value from the video data; and deriving the offset magnitude based on bit depth obtained from the video data when the boolean value is true.

10. A decoder comprising a filtering control device configured to decode, in a sample adaptive filtering procedure, a first picture, wherein the first picture is reconstructed from video data comprising a coded bitstream, the filtering control device comprising a processing circuit configured to perform operation comprising:

decoding an offset magnitude from the video data comprising the coded bitstream, wherein the offset magnitude indicates a magnitude of a sample adaptive offset, saoOffset, to be applied in the sample adaptive filtering procedure;

decoding an offset sign from the video data comprising the coded bitstream, wherein the offset sign indicates a sign of the sample adaptive offset saoOffset;

wherein the sample adaptive offset saoOffset is a band offset and/or an edge offset, wherein the sample adaptive offset saoOffset is coded by variable length code or fixed length code or Context-Adaptive Binary Arithmetic Coding, CABAC, and the offset sign and the offset magnitude are coded separately in the video data;

wherein a mapping exists between the sample adaptive offset saoOffset and a further sample adaptive offset value SaoOffsetVal, the mapping being:

saoOffset=log2(abs(SaoOffsetVal))*sign(SaoOffsetVal);

determine the further sample adaptive offset value SaoOffsetVal based on the offset magnitude and the offset sign; and process, in the sample adaptive filtering procedure, at least a portion of the first picture by applying the further sample adaptive offset value SaoOffsetVal.

11. The filtering control device according to claim 10, wherein the processing circuit further is configured to perform operations comprising:
decoding, from the video data comprising the coded bitstream, a band position indicating a first band of a set of consecutive bands.

12. The filtering control device according to claim 11, wherein the processing circuit further is configured to perform operations comprising:
applying the offset magnitude and the offset sign to one or more of the consecutive bands.

13. The filtering control device according to claim 10, wherein the processing circuit further is configured to perform operations comprising:
obtaining a value from the video data; and
mapping the value to the offset magnitude in a non-linear manner, wherein the mapping decreases in terms of accuracy for the obtained offset magnitude as the offset magnitude increases.

14. The filtering control device according to claim 10,
wherein an output of the sample adaptive filtering procedure is stored in a second picture, and
wherein the processing circuit further is configured to perform operations comprising:
setting the offset magnitude based on bit depth obtained from the video data, and setting the offset sign based on the bit depth,
wherein a pixel value of the second picture is between 0 and a maximum value according to the bit depth.

15. The filtering control device according to claim 14, wherein the processing circuit further is configured to perform operations comprising:
applying the further sample adaptive offset value SaoOffsetVal to one of the consecutive bands,
wherein the offset sign is positive when the band position indicates an initial band among bands covering possible pixel values according to bit depth obtained from the video data for a second picture, and
wherein the offset sign is negative when the band position indicates a band for which the further sample adaptive offset value SaoOffsetVal covers a last band among bands covering possible pixel values according to bit depth obtained from the video data for the second picture.

16. The filtering control device according to claim 10, wherein the processing circuit further is configured to perform operations comprising:
computing the further sample adaptive offset value SaoOffsetVal by applying sign operations and shift operations onto the offset magnitude and the offset sign.

17. The filtering control device according to claim 16, wherein a shift magnitude of the shift operation is obtained from the video data.

18. The filtering control device according to claim 10, wherein the processing circuit further is configured to perform operations comprising:
obtaining a boolean value from the video data; and
deriving the offset magnitude based on bit depth obtained from the video data when the boolean value is true.

19. A computer program product for decoding, in a sample adaptive filtering procedure, a first picture, wherein the first picture is reconstructed from video data comprising a coded bitstream, wherein the computer program product comprises a non-transitory computer readable medium containing computer readable code which when executed on a computer causes the computer to perform operations comprising:
decoding an offset magnitude from the video data comprising the coded bitstream, wherein the offset magnitude indicates a magnitude of a sample adaptive offset, saoOffset, to be applied in the sample adaptive filtering procedure;
decoding an offset sign from the video data comprising the coded bitstream, wherein the offset sign indicates a sign of the sample adaptive offset saoOffset;
determining the sample adaptive offset based on the offset magnitude and the offset sign;
wherein the sample adaptive offset saoOffset is a band offset and/or an edge offset,
wherein the sample adaptive offset saoOffset is coded by variable length code or fixed length code or Context-Adaptive Binary Arithmetic Coding, CABAC, and the offset sign and the offset magnitude are coded separately in the video data;
wherein a mapping exists between the sample adaptive offset saoOffset and a further sample adaptive offset value SaoOffsetVal, the mapping being:

saoOffset=log2(abs(SaoOffsetVal))*sign(SaoOffsetVal);

and
processing, in the sample adaptive filtering procedure, at least a portion of the first picture by applying the further sample adaptive offset value SaoOffsetVal.

20. The computer program product of claim 19, wherein an output of the sample adaptive filtering procedure is stored in a second picture.

* * * * *

UNITED STATES PATENT AND TRADEMARK OFFICE
CERTIFICATE OF CORRECTION

| | |
|---|---|
| PATENT NO. | : 10,085,020 B2 |
| APPLICATION NO. | : 14/389671 |
| DATED | : September 25, 2018 |
| INVENTOR(S) | : Andersson et al. |

It is certified that error appears in the above-identified patent and that said Letters Patent is hereby corrected as shown below:

In the Specification

In Column 1, below Title, insert -- CROSS REFERENCE TO RELATED APPLICATIONS
This application is a 35 U.S.C. § 371 national stage application of PCT International Application No. PCT/SE2013/050270, filed on 15 March 2013, which itself claims priority to U.S. provisional Patent Application No. 61/624,726, filed 16 April 2012 and U.S. provisional Patent Application No. 61/620,639, filed 5 April 2012, the disclosure and content of all of which are incorporated by reference herein in their entirety. The above-referenced PCT International Application was published in the English language as International Publication No. WO 2013/151481 A2 on 10 October 2013. --.

In Column 2, Line 17, delete "FIG. 2a" and insert -- FIG. 2 --, therefor.

In Column 4, Line 26, delete "herein, and" and insert -- herein, --, therefor.

In Column 4, Line 29, delete "herein." and insert -- herein, and --, therefor.

In Column 4, Line 40, delete "HVEC," and insert -- HEVC, --, therefor.

In Column 4, Line 59, delete "(cldx" and insert -- (cIdx --, therefor.

In Column 4, Line 60, delete "cldx" and insert -- cIdx --, therefor.

In Column 4, Line 64, delete "[cldx]" and insert -- [cIdx] --, therefor.

In Column 5, Line 57, delete "[cldx]" and insert -- [cIdx] --, therefor.

In Column 5, Line 59, delete "[cldx]" and insert -- [cIdx] --, therefor.

In Column 5, Line 60, delete "Table 7-6" and insert -- Table VI --, therefor.

Signed and Sealed this
Thirty-first Day of December, 2019

Andrei Iancu
*Director of the United States Patent and Trademark Office*

CERTIFICATE OF CORRECTION (continued)
U.S. Pat. No. 10,085,020 B2

In Column 5, Line 61, delete "cldx." and insert -- cIdx. --, therefor.

In Column 5, Line 62, delete "[cldx]" and insert -- [cIdx] --, therefor.

In Column 5, Line 64, delete "[cldx]" and insert -- [cIdx] --, therefor.

In Column 5, Line 65, delete "[r][ry]" and insert -- [rx][ry] --, therefor.

In Column 5, Line 65, delete "[cldx]" and insert -- [cIdx] --, therefor.

In Column 5, Line 66, delete "[cldx]" and insert -- [cIdx] --, therefor.

In Column 5, Line 67, delete "[cldx]" and insert -- [cIdx] --, therefor.

In Column 6, Line 13, delete "[cldx]" and insert -- [cIdx] --, therefor.

In Column 6, Line 15, delete "[cldx]" and insert -- [cIdx] --, therefor.

In Column 6, Line 16, delete "[cldx]" and insert -- [cIdx] --, therefor.

In Column 6, Line 19, delete "[cldx]" and insert -- [cIdx] --, therefor.

In Column 6, Line 19, delete "[cldx]" and insert -- [cIdx] --, therefor.

In Column 6, Line 22, delete "[cldx]" and insert -- [cIdx] --, therefor.

In Column 6, Line 23, delete "[cldx]" and insert -- [cIdx] --, therefor.

In Column 6, Line 24, delete "[cldx]" and insert -- [cIdx] --, therefor.

In Column 6, Line 26, delete "cldx." and insert -- cIdx. --, therefor.

In Column 6, Line 28, delete "cldx" and insert -- cIdx --, therefor.

In Column 6, Line 29, delete "(cldx" and insert -- (cIdx --, therefor.

In Column 6, Line 32, delete "[cldx]" and insert -- [cIdx] --, therefor.

In Column 6, Line 33, delete "[cldx]" and insert -- [cIdx] --, therefor.

In Column 6, Line 35, delete "[cldx]" and insert -- [cIdx] --, therefor.

In Column 6, Line 38, delete "[cldx]" and insert -- [cIdx] --, therefor.

In Column 6, Line 40, delete "[cldx]" and insert -- [cIdx] --, therefor.

CERTIFICATE OF CORRECTION (continued)
U.S. Pat. No. 10,085,020 B2

In Column 6, Line 41, delete "[cldx]" and insert -- [cIdx] --, therefor.

In Column 6, Line 42, delete "[cldx]" and insert -- [cIdx] --, therefor.

In Column 6, Line 43, delete "[cldx]" and insert -- [cIdx] --, therefor.

In Column 6, Line 45, delete "[cldx]" and insert -- [cIdx] --, therefor.

In Column 6, Line 47, delete "[cldx]" and insert -- [cIdx] --, therefor.

In Column 6, Line 58, delete "TABLE VI" and insert -- TABLE IV --, therefor.

In Column 7, Line 1, delete "TABLE VI" and insert -- TABLE IV --, therefor.

In Column 7, Line 12, delete "cldx" and insert -- cIdx --, therefor.

In Column 8, Line 58, delete "sign;" and insert -- sign. --, therefor.

In Column 10, Line 38, delete "[cldx]" and insert -- [cIdx] --, therefor.

In Column 10, Line 40, delete "[cldx]" and insert -- [cIdx] --, therefor.

In Column 11, Line 17, delete "[cldx][rx][r]" and insert -- [cIdx][rx][ry] --, therefor.

In Column 11, Line 19, delete "cldx" and insert -- cIdx. --, therefor.

In Column 12, Line 22, delete "bandldx" and insert -- bandIdx --, therefor.

In Column 13, Line 12, delete "[cldx]" and insert -- [cIdx] --, therefor.

In Column 13, Line 31, delete "[cldx]" and insert -- [cIdx] --, therefor.

In Column 15, Line 27, delete "bandldx" and insert -- bandIdx --, therefor.

In Column 15, Line 29, delete "bandldx" and insert -- bandIdx --, therefor.

In Column 16, Line 61, delete "output form" and insert -- output from --, therefor.

In Column 17, Line 45, delete "en encoder," and insert -- an encoder, --, therefor.

In Column 18, Line 11, delete "according embodiments" and insert -- according to embodiments --, therefor.

In Column 20, Line 43, delete "computer program product 74" and insert -- computer program product 73 --, therefor.